United States Patent
Abali et al.

(10) Patent No.: US 9,804,927 B2
(45) Date of Patent: Oct. 31, 2017

(54) VIRTUAL MACHINE DISTRIBUTED CHECKPOINTING

(71) Applicant: Lenovo Enterprise Solutions (Singapore) Pte. Ltd., Singapore (SG)

(72) Inventors: Bulent Abali, Tenafly, NJ (US); Hubertus Franke, Cortlandt Manor, NY (US); Michael R. Hines, White Plains, NY (US); Gokul B. Kandiraju, Briarcliff Manor, NY (US); Makoto Ono, Chapel Hill, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 129 days.

(21) Appl. No.: 14/583,618

(22) Filed: Dec. 27, 2014

(65) Prior Publication Data

US 2016/0188413 A1 Jun. 30, 2016

(51) Int. Cl.
  G06F 11/00 (2006.01)
  G06F 11/14 (2006.01)
  G06F 9/455 (2006.01)
  G06F 11/20 (2006.01)

(52) U.S. Cl.
  CPC ...... *G06F 11/1438* (2013.01); *G06F 9/45558* (2013.01); *G06F 11/1484* (2013.01); *G06F 11/202* (2013.01); *G06F 2009/45591* (2013.01); *G06F 2201/815* (2013.01); *G06F 2201/84* (2013.01)

(58) Field of Classification Search
  CPC .................................................. G06F 11/1438
  See application file for complete search history.

(56) References Cited

U.S. PATENT DOCUMENTS

| 6,934,755 | B1 | 8/2005 | Saulpaugh et al. | |
| 9,053,064 | B2* | 6/2015 | Garthwaite | G06F 12/16 |
| 2002/0165942 | A1* | 11/2002 | Ulrich | G06F 9/5083 |
| | | | | 709/219 |
| 2003/0028704 | A1* | 2/2003 | Mukaida | G06F 12/0607 |
| | | | | 711/5 |
| 2006/0250922 | A1* | 11/2006 | Sasaki | G11B 20/10 |
| | | | | 369/59.25 |
| 2007/0074089 | A1* | 3/2007 | Matsumoto | G11B 20/1883 |
| | | | | 714/710 |
| 2009/0282101 | A1 | 11/2009 | Lim et al. | |
| 2010/0299578 | A1* | 11/2010 | Shin | H03M 13/251 |
| | | | | 714/776 |

(Continued)

OTHER PUBLICATIONS

Barkes, J. et al.; "GPFS: A Parallel File System"; IBM Corporation; http://www.ibm.com/redbooks/sg24-5165-00 . . . ; Apr. 1998.

(Continued)

*Primary Examiner* — Christopher McCarthy
(74) *Attorney, Agent, or Firm* — Jeffrey L. Streets

(57) ABSTRACT

A method, system and computer program product for checkpointing virtual machines (VMs). The system includes a primary computer hosting a hypervisor and a primary VM. The hypervisor is configured instantiate the primary VM, divide the state of the primary VM into a plurality of memory blocks, and generate an error correction block based on the plurality of memory blocks. The system further includes a plurality of secondary computers. Each of the secondary computers stores a secondary VM and one of either the memory blocks or the error correction block.

20 Claims, 4 Drawing Sheets

(56) References Cited

U.S. PATENT DOCUMENTS

| | | | |
|---|---|---|---|
| 2011/0246823 A1 | 10/2011 | Khan et al. | |
| 2012/0191908 A1* | 7/2012 | North | G06F 11/2097 711/112 |
| 2013/0060948 A1* | 3/2013 | Ulrich | G06F 17/30067 709/226 |
| 2013/0074065 A1* | 3/2013 | McNeeney | G06F 11/141 718/1 |
| 2013/0097120 A1* | 4/2013 | Mummidi | G06F 17/30289 707/649 |
| 2014/0059380 A1* | 2/2014 | Krishnan | G06F 11/1415 714/15 |
| 2014/0082311 A1* | 3/2014 | McNeeney | G06F 11/141 711/162 |

OTHER PUBLICATIONS

Kannan, S. et al.; "Workload Management with LoadLeveler"; IBM Corporation; http://www.ibm.com/redbooks/sg24-6038-00 . . . Nov. 2001.

Goiri, I. et al.; "Checkpoint-based fault-tolerant infrastructure for virtualized service providers"; 2010 IEEE/IFIP Network Operations and Management Symposium—NOMS 2010, pp. 455-462; IEEE; 2010.

Whisnant, K. et al.; "Micro-checkpointing: checkpointing for multithreaded applications"; Proceedings 6th IEEE International On-Line Testing Workshop, pp. 3-8, IEEE Computer Society; 2000.

Hou, et al., HydraVM: Low-Cost, Transparent High Availability for Virtual Machines, Hewlett-Packard Development Company, L.P., http://www.hpl.hp.com/techreports/2011/HPL-2011-24.pdf (Feb. 21, 2011).

\* cited by examiner

VIRTUAL MACHINE DISTRIBUTED CHECKPOINTING

BACKGROUND

This invention relates to computing systems, and more particularly, adding fault tolerance into virtual machine (VM) computing systems.

In the recent years, virtualization has not only evolved as a key consolidation technology, but also formed the foundation for cloud computing. The ability to create and manage virtual machines has become a necessity for data-center management. Cloud providers typically use these techniques to consolidate multiple applications-VMs (potentially from different clients) onto a single node to minimize their cost and to take maximum advantage of virtualization. At the same time, cloud consumers expect VMs (and applications) to obey desired SLAs (Service Level Agreements) in order to satisfy their own client needs. Today, two important ingredients of such SLAs are performance and availability constraints.

On the availability front, variants of SLAs typically include: (i) local restart, (ii) remote restart, (iii) live migration, and (iv) micro-checkpointing. While the first two items are simple to implement, they come with certain downtime for the application and loss of all the current VM state. Live migration, while offering no downtime, can take a few minutes to complete. The last item, micro-checkpointing, has been gaining attention in the recent years as a way to switch to a secondary copy instantaneously, thereby offering high availability at the expense of some performance impact.

Most micro-checkpointing implementations today have a primary VM and a secondary VM (typically on different nodes to survive a node failure), with the secondary VM mirroring the primary. Frequent (millisecond interval) checkpoints are sent from the primary to the secondary over the network, which contain the latest modified data of the primary VM. The secondary VM, as such, does not execute any application by itself, but simply applies all the modifications (in-memory) sent by the primary to reach the same state as the primary.

While this approach allows for instantaneous switch over to the secondary in the event of a primary crash/failure, the disadvantages with this approach are: (i) there is still only one copy left if the primary crashes thus not honoring the SLA guaranteed for a span of time (it would take some amount of time to setup of the conversion of the secondary to a new primary and instantiating a new secondary), (ii) the amount of memory taken by the secondary is the same as primary, which means, if primary is a large memory node with an enterprise application, the cloud provider would have to dedicate a similar node for the secondary all the time, (iii) a typical heterogeneous infrastructure with several nodes of different memory sizes and connected using different network links would not be used to the full extent (since there are only two nodes involved), and (iv) if both the primary and secondary nodes crash, then the application crashes (does not tolerate two node failures).

BRIEF SUMMARY

Embodiments of the current invention propose a novel way of distributing checkpoints on multiple nodes as opposed to the conventional way of using only one secondary node. By distributing checkpoints over multiple nodes and having optional nodes for parity/replicas, such solutions can survive double node failures as well.

Accordingly, one example aspect of the present invention is a method for checkpointing virtual machines. The method includes executing an application by a primary virtual machine on a primary computer. A divide operation divides a virtual machine state of the primary virtual machine into a plurality of memory blocks. The virtual machine state includes at least a virtual memory state and a virtual central processing unit (CPU) state of the primary virtual machine. A generating step generates an error correction block based on the plurality of memory blocks such that if one of the memory blocks becomes an unusable memory block, the error correction block can restore the unusable memory block. Thus, the error correction block is utilized to restore the virtual machine state when one of the memory blocks becomes unusable. A store operation stores the memory blocks and error correction block across a plurality of secondary computers. The method includes iterating the divide, generate and store operations over time.

Another example aspect of the present invention is a system for checkpointing virtual machines. The system includes a primary computer and a primary hypervisor executing on the primary computer. The primary hypervisor is configured to instantiate a primary virtual machine, to divide a virtual machine state of the primary virtual machine into a plurality of memory blocks, and generate an error correction block based on the plurality of memory blocks. The virtual machine state includes at least a virtual memory state and a virtual CPU state of the primary virtual machine. The error correction block is utilized to restore the virtual memory state when one of the memory blocks becomes unusable. The system further includes a plurality of secondary computers. Each of the secondary computers stores a secondary virtual machine and one of either the memory blocks or the error correction block.

Yet another example aspect of the present invention is a computer program product for checkpointing virtual machines. The computer program product includes computer readable program code configured to: execute an application by a primary virtual machine on a primary computer; divide a virtual machine state of the primary virtual machine into a plurality of memory blocks, the virtual machine state including a virtual memory state and a virtual central processing unit (CPU) state of the primary virtual machine; generate an error correction block based on the plurality of memory blocks such that if one of the memory blocks becomes an unusable memory block, the error correction block can restore the unusable memory block, the error correction block being utilized to restore the virtual machine state when one of the memory blocks becomes unusable; store the memory blocks and error correction block across a plurality of secondary computers; and iterate the divide, generate and store operations over time.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
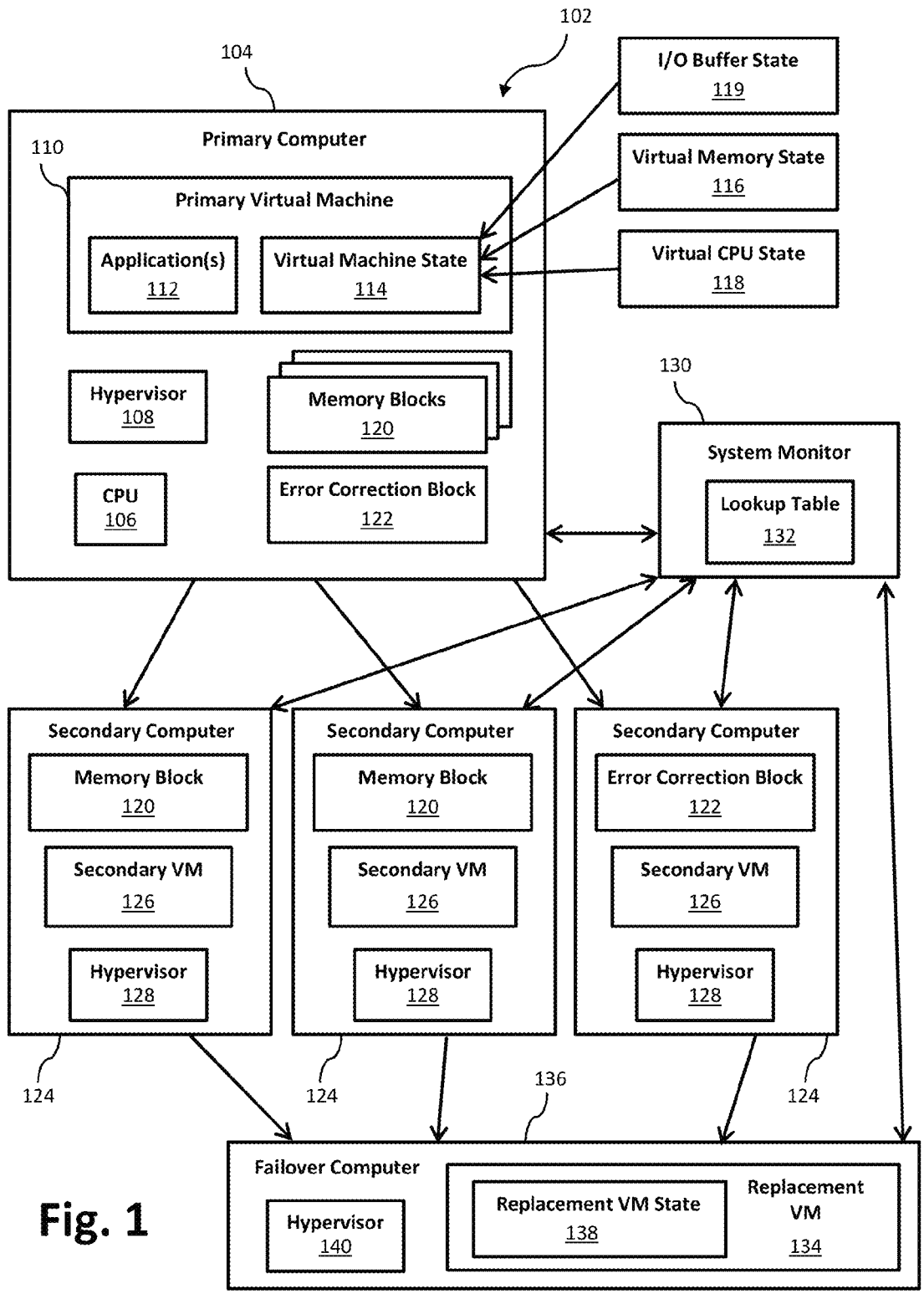
FIG. 1 shows a system for checkpointing virtual machines, as contemplated by one embodiment of the present invention.

The present invention is described with reference to embodiments of the invention. Throughout the description of the invention reference is made to FIGS. 1-4. When referring to the figures, like structures and elements shown throughout are indicated with like reference numerals.

Embodiments of the present invention reconstruct a primary virtual machine at a node involved in a checkpointing process. This process involves accumulating data from all the required nodes to rebuild the primary virtual machine.

FIG. 1 shows a system 102 for checkpointing virtual machines, as contemplated by one embodiment of the present invention. As used herein, checkpointing is a process of providing fault tolerance to computing systems by replicating the state of a primary virtual machine to a plurality of secondary virtual machines. Furthermore, a process called micro-checkpointing synchronizes the state of the primary virtual machine and secondary virtual machines every few dozen milliseconds. Synchronization is achieved by copying changed server state of primary virtual machine to the secondary virtual machines. The system 102 includes a primary computer 104 with a computer processing unit (CPU) 106.

A hypervisor 108 executes on the primary computer. The hypervisor 108 is configured to instantiate a primary virtual machine 110. As used herein, a hypervisor is computer program that runs one or more virtual machines on a host computer. A virtual machine, sometimes referred to as a guest machine, is defined herein as an emulation of a particular computer system on the host computer.

The primary virtual machine 110 may execute one or more applications 112. Furthermore, the primary virtual machine 110 includes a virtual machine state 114. The virtual machine state 114 may include a virtual memory state 116, a virtual CPU state 118 and an I/O buffer state 119 of the primary virtual machine 110. In other words, the virtual machine state 114 is a snapshot of the primary virtual machine's state at a point in time.

In one embodiment, the hypervisor 108 divides the virtual machine state 114 into a plurality of memory blocks 120 or "chunks". Thus, each memory block 120 contains only a portion of the virtual machine state 114.

The hypervisor 108 also generates an error correction block 122 based on the memory blocks 120. Specifically, the error correction block 122 can be utilized to restore the virtual machine state 114 when one of the memory blocks 120 becomes unusable (i.e., corrupted). In one embodiment, the error correction block 122 is generated by performing an XOR operation on the memory blocks 120. In this embodiment, the error correction block 122 contains parity bits for the memory blocks 120. It is contemplated that other known error correction techniques, such as low-density parity-check (LDPC) codes and Hamming codes, may be utilized in the error correction block 122.

In one embodiment, the primary hypervisor is configured to suspend execution of instructions at the primary virtual machine 110 prior to dividing the virtual machine state 114 into the memory blocks 120. The primary hypervisor may also be configured to resume execution of the instructions at the primary virtual machine 110 after dividing the virtual machine state 114 into the plurality of memory blocks 120.

The system 102 further includes a plurality of secondary computers 124. Each of the secondary computers 124 may further include at least one secondary virtual machine 126, a secondary hypervisor 128, and a CPU (not shown). Each secondary computer 124 stores one of either the memory blocks 120 or the error correction block 122 on a secondary virtual machine 112. Accordingly, if N memory blocks 120 and M error correction blocks 122 are generated, the system 102 will contain N+M secondary virtual machines 112, each secondary virtual machine 124 stores a unique block, with N secondary virtual machines 124 storing one of the N memory blocks 120 and M secondary virtual machines 124 storing one of the M error correction blocks 122. In a particular embodiment of the present invention, the memory blocks 120 and the error correction blocks 122 are stored in random access memory (RAM) of the secondary computers 124.

It is contemplated that the memory blocks 120 and the error correction block 122 may be distributed on the secondary computer 124 in various configurations. In one embodiment, one of the secondary computers 124 is dedicated to storing the error correction blocks 122. In another embodiment, the error correction blocks 122 are distributed over the secondary computers 124.

It is noted the operations of dividing the virtual machine state 114 into the plurality of memory blocks 120, generating the error correction block 122 and storing the blocks 114, 120 at the secondary computers 124 occur repeatedly over time. For example, the divide, generate and store operations may be iterated every 10 to 100 milliseconds.

The system 102 includes a system monitor 130 to distribute the memory blocks 120 and the error correction blocks 122 to the secondary computers 124. In one embodiment, a lookup table 128 is used to distribute the blocks 120, 122 to the secondary computers 124.

The system monitor 130 is also configured to detect failures at the primary virtual machine 110 and the secondary virtual machines 126. A failure may include, for example, an unresponsive virtual machine or loss of network connectivity to the virtual machine. When the system monitor 126 detects a failure at the primary virtual machine 110, it activates a replacement virtual machine 134 at a failover computer 136 via a hypervisor 140. The replacement virtual machine 134 includes a replacement virtual machine state 138 constructed from the memory blocks 120 and the error correction block 122 stored across the secondary virtual machines 124.

In this manner, the system monitor 126 performs a migration of the primary virtual machine 110 and all of its corresponding memory, cpu and I/O state from the primary computer 104 to the failover computer 136. During the migration, clients of the applications 112 interacting with the primary virtual machine 110 are not interrupted. Instead, client network traffic is routed to the replacement virtual machine 134 with no perceivable change to the clients. In one embodiment, the replacement virtual machine 134 is one of the secondary virtual machines 126.

As mentioned above, the system monitor 130 may also detect a failed secondary virtual machine 126. When such a failure is detected, system monitor 130 deploys a replacement virtual machine to store the memory block 120 or error correction block 122 previously stored in the failed secondary virtual machine.

Figure 2:
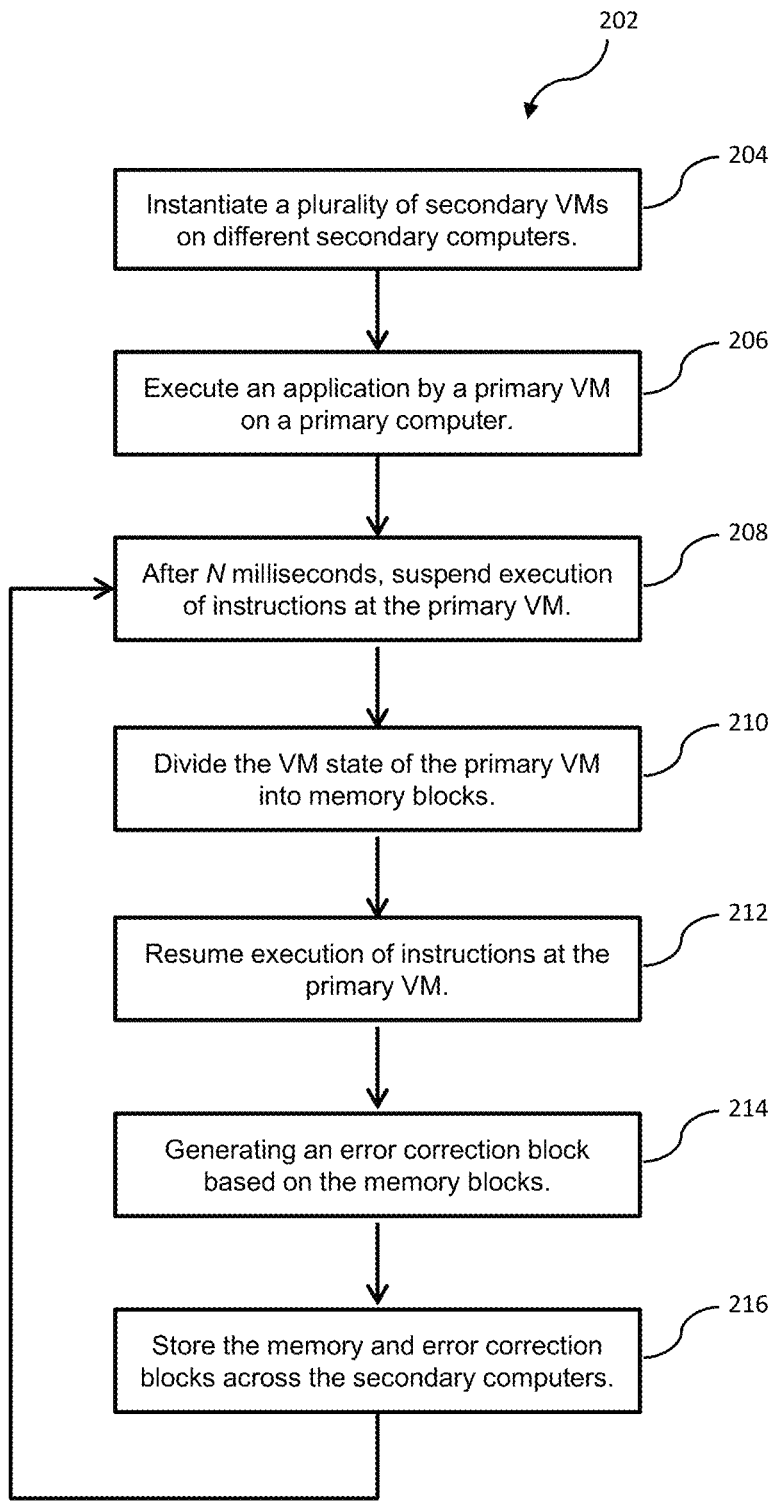
FIG. 2 shows a process for checkpointing virtual machines, as contemplated by one embodiment of the present invention.

FIG. 2 shows a process 202 for checkpointing virtual machines, as contemplated by one embodiment of the present invention. The process 202 begins with instantiate operation 204. During this step, several secondary virtual machines are instantiated on a plurality of different secondary computers. After instantiate operation 204 is completed, control passes to execute operation 206.

At execute operation 206, an application is executed by a primary virtual machine on a primary computer. The application may be a legacy operation that is not designed for system recovery after a fault. Once execute operation 206 is completed, control passes to suspend operation 208.

At suspend operation 208, execution of instructions at the primary virtual machine is suspended after a fixed amount of time. This operation may be initiated by a hypervisor at the primary computer, or by a remote system controller. For example, the primary virtual machine may be suspended every 10 to 100 ms, depending on system performance. After suspend operation 208 is completed, control passes to divide operation 210.

At divide operation 210, the virtual machine state of the primary virtual machine is divided into a plurality of memory blocks. As discussed above, the virtual machine state may include the memory and CPU state of the primary virtual machine. After divide operation 210 is completed, control passes to resume operation 212.

At resume operation 212, execution of the instructions at the primary virtual machine is resumed. Resumption of the primary virtual machine may be initiated by a hypervisor at the primary computer, or by a remote system controller. After resume operation 212 is completed, control passes to generate operation 214.

At generate operation 214, an error correction block is generated based on the memory blocks. The error correction block is configured such that if one of the memory blocks becomes an unusable memory block, the error correction block can restore the unusable memory block. In this manner, the error correction block is used to restore the virtual machine state when one of the memory blocks becomes unusable. As discussed above, generating the error correction block may include performing an exclusive-or (XOR) operation on the memory blocks. After generate operation 214 is completed, control passes to store operation 216.

At store operation 216, the memory blocks and error correction block are stored across the plurality of secondary computers. Each secondary computer stores either one of the memory blocks or the error correction block on a secondary virtual machine. After the store operation 216 is completed, the process loops and suspend operation 208, divide operation 210, resume operation 212, generate operation 214 and store operation 216 are iterated over time.

Figure 3A:
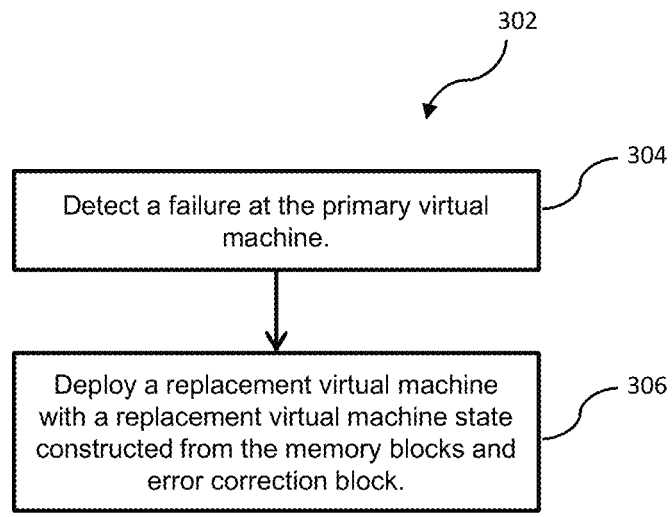
FIG. 3A illustrates a process for handling a failure at the primary virtual machine, as contemplated by one embodiment of the present invention.

FIG. 3A shows a process 302 for handling a failure at the primary virtual machine, as contemplated by one embodiment of the present invention. The process 302 starts with a detect operation 304 to detect a failure at the primary virtual machine. In one embodiment, detect operation 304 may be performed by a remote system controller. If a failure at the primary virtual machine is detected, control passes to deploy operation 306.

At deploy operation 306, a replacement virtual machine is deployed after detecting the failure at the primary virtual machine. The replacement virtual machine includes a replacement virtual machine state constructed from the memory blocks and error correction block stored across the secondary virtual machines. In a particular embodiment, the replacement virtual machine is one of the secondary virtual machines.

Figure 3B:
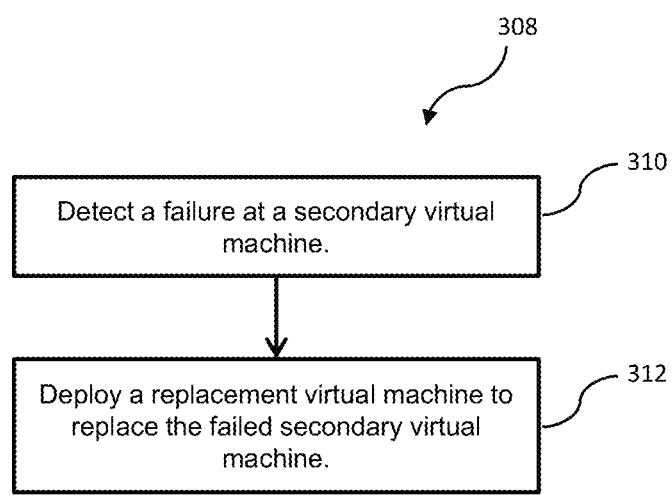
FIG. 3B illustrates a process for handling a failed secondary virtual machine, as contemplated by one embodiment of the present invention.

FIG. 3B shows a process 308 for handling a failed secondary virtual machine, as contemplated by one embodiment of the present invention. The process 308 starts with a detect operation 310 to detect a failure at the secondary virtual machine. In one embodiment, detect operation 310 may be performed by a remote system controller. If a failure at the secondary virtual machine is detected, control passes to deploy operation 312.

At deploy operation 312, a replacement virtual machine is deployed after detecting the failure at the secondary virtual machine. The replacement virtual machine is configured to store one of the memory blocks or error correction block previously stored in the failed secondary virtual machine.

Figure 4:
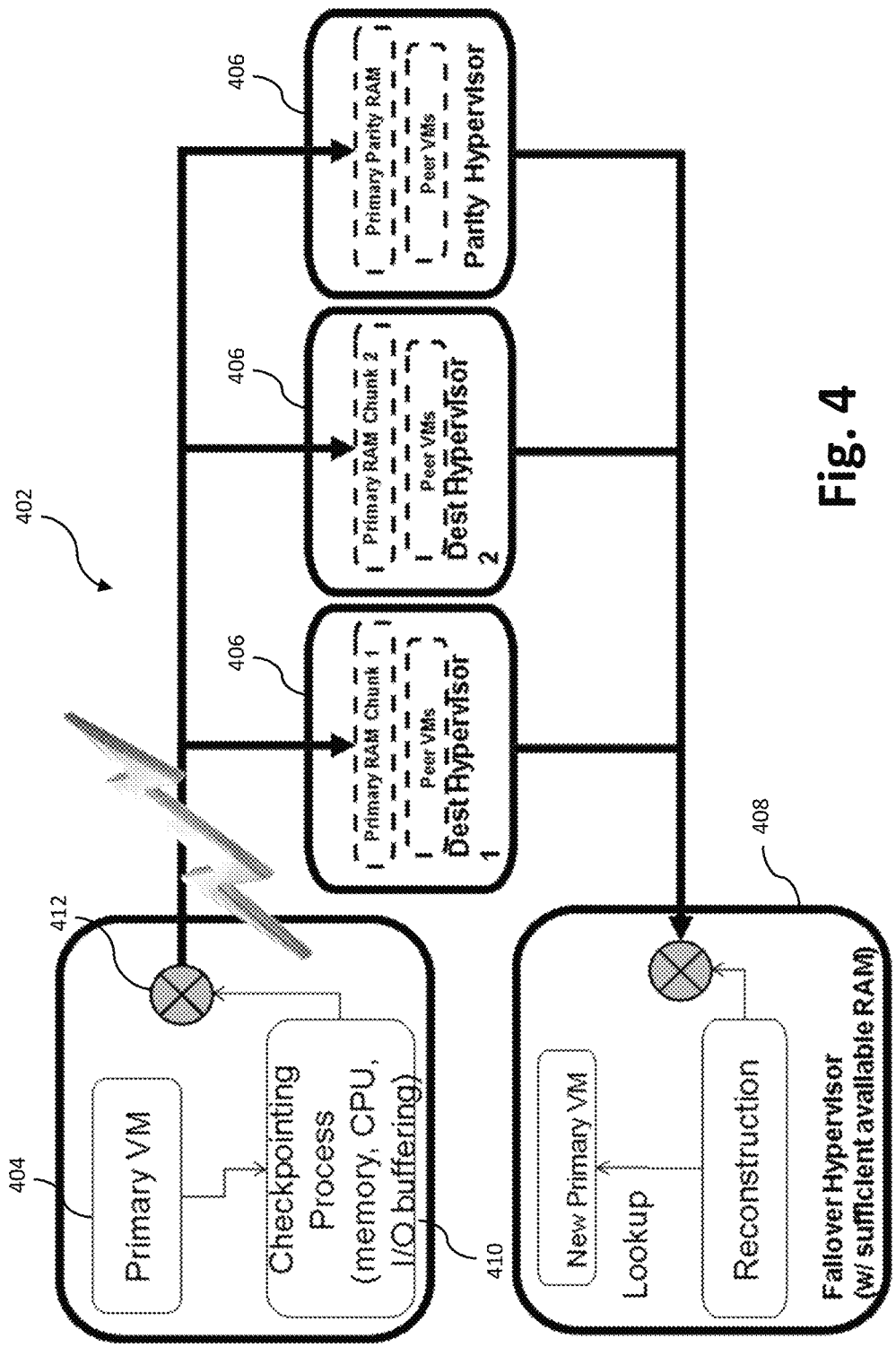
FIG. 4 shows another embodiment of a system for checkpointing virtual machines contemplated by the present invention.

FIG. 4 shows another embodiment of a system 402 for checkpointing virtual machines contemplated by the present invention. The system 402 includes a primary VM 404 and a plurality of secondary VMs 406. The entire state of the primary VM 404, including the primary VM's memory, CPU, disk and network state, is checkpointed. That is, the state is replicated very rapidly—for example, at the granularity of tens of milliseconds. Thus, at about every tenth of a second, a snapshot is taken of what has changed in memory, network, storage and CPU of the primary VM's states and is copied to the secondary VMs 406.

For instance, the primary virtual machine 404 may have 4 GB of virtual machine state and the system may be configured with ten secondary computers 406. Thus, the 4 GB virtual machine state is split across the secondary computers 406 so that each secondary VM 406 stores approximately 400 MB of state information. If a failure occurs at the primary virtual machine 404, any of the surviving secondary computers 406 can recover the primary virtual machine's state.

In one embodiment, chunking the primary VM's state involves splitting the state data into equal parts. The number of parts is dependent on the number of secondary VMs 406 used. Each chunk is stored on a secondary VM 406. The XOR of each chunk is computed and stored on a secondary VM 406 acting as the parity machine to store recovery information.

It is contemplated that at the time a failure at the primary virtual machine 404 occurs, the system 402 may designate one of the secondary computers 406 to be the replacement primary VM. Any of the secondary computers 406 may be a candidate to recover a failed primary virtual machine 404. The system can opportunistically choose the best secondary computer 406 by comparing, for example, the capacity of each secondary computer 406. Alternatively, the system 402 may designate a computer 408 that is not one of the secondary computers 406 to become the replacement primary VM.

The system includes a checkpoint processor 410. The checkpoint processor 410 identifies what VM state changed since the last checkpoint. The checkpoint processor 410 gathers the changed data efficiently and routes the data to the correct secondary computer 406 using a lookup table 412. The system 402 beneficially distributes network traffic for the primary VM 404 across multiple ports, rather than relying on a point-to-point checkpointing process.

When the system is in operation, there may be a risk assessment of which faults are likely or are expected over time. It is contemplated that virtual machine 404 and the secondary computers 406 may be placed in different fault domains so that expected faults do not overlap. A fault domain is defined as a group of computers which share a particular utility, such as the same source of electricity, or the same networking infrastructure, or the same storage infrastructure, where a fault in one part of the utility can affect all of the computers in the same fault domain sharing the same utility. Thus, it is desirable not to place secondary virtual machines in the same fault domain to decrease the risk of two failures happening at the same time. Furthermore, if one of the secondary computers 406 fails, the system may select a replacement secondary computer and resend only the chuck of the failed secondary to the replacement secondary. Alternatively, the system may reconstruct the chunk from the remaining secondary computers.

As will be appreciated by those skilled in the art, some of the advantages that may be achieved by the disclosed embodiments are:

(i) not having to dedicate entire machines with large memory for micro-checkpointing large-memory applications;

(ii) ability to tolerate double-node failures, if configured;

(iii) making use of the data-center heterogeneous resources more effectively;

(iv) providing flexibility to "migrate" the check-pointed VM to any one of the nodes by re-constructing the VM at that node, i.e., providing the flexibility to migrate (even before a failure) to any node while maintaining the same level of availability that was guaranteed; and (v) load balancing of checkpoint network traffic among the receiving nodes.

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for checkpointing virtual machines, the method comprising: executing an application by a primary virtual machine on a primary computer; dividing a virtual machine state of the primary virtual machine into a plurality of memory blocks, the virtual machine state including a virtual memory state and a virtual central processing unit (CPU) state of the primary virtual machine; generating an error correction block based on the plurality of memory blocks such that if one of the memory blocks becomes an unusable memory block, the error correction block can restore the unusable memory block, the error correction block being utilized to restore the virtual machine state when one of the memory blocks becomes unusable; storing the memory blocks and error correction block across a plurality of secondary computers, each secondary computer stores a secondary virtual machine; and iterating the divide, generate and store operations over time.

2. The method of claim 1, further comprising:
suspending execution of instructions at the primary virtual machine prior to dividing the virtual machine state of the primary virtual machine into the plurality of memory blocks; and
resuming execution of the instructions at the primary virtual machine after dividing the virtual machine state of the primary virtual machine into the plurality of memory blocks.

3. The method of claim 1, further comprising:
detecting a failure at the primary virtual machine; and
deploying a replacement virtual machine after detecting the failure at the primary virtual machine, the replacement virtual machine including a replacement virtual machine state constructed from the memory blocks and error correction block stored across the secondary virtual machines.

4. The method of claim 3, wherein the replacement virtual machine is one of the plurality of secondary virtual machines.

5. The method of claim 1, further comprising:
detecting a failed secondary virtual machine from one of the plurality of secondary virtual machines; and
deploying a replacement virtual machine to store one of the memory blocks or error correction block previously stored in the failed secondary virtual machine upon detecting the failed secondary virtual machine.

6. The method of claim 1, wherein generating the error correction block includes performing an exclusive-or operation on the memory blocks.

7. The method of claim 1, further comprising instantiating each of the plurality of secondary virtual machines on a different secondary computer.

8. A system for checkpointing virtual machines, comprising:
a primary computer including a primary computer processing unit (CPU);
a primary hypervisor executing on the primary computer, wherein the primary hypervisor instantiates a primary virtual machine, divides a virtual machine state of the primary virtual machine into a plurality of memory blocks, and generates an error correction block based on the plurality of memory blocks, the virtual machine state including a virtual memory state and a virtual CPU state of the primary virtual machine, the error correction block being utilized to restore the virtual memory state when one of the memory blocks becomes unusable; and
a plurality of secondary computers, each of the secondary computers storing a secondary virtual machine and one of either the memory blocks or the error correction block.

9. The system of claim 8, wherein the primary hypervisor suspends execution of instructions at the primary virtual machine prior to dividing the virtual machine state of the primary virtual machine into the plurality of memory blocks; and
resumes execution of the instructions at the primary virtual machine after dividing the virtual machine state of the primary virtual machine into the plurality of memory blocks.

10. The system of claim 8, further comprising a system monitor to detect a failure at the primary virtual machine and to deploy a replacement virtual machine after detecting the failure at the primary virtual machine, the replacement virtual machine including a replacement virtual machine state constructed from the memory blocks and error correction block stored across the secondary computers.

11. The system of claim 10, wherein the replacement virtual machine is one of the secondary virtual machines.

12. The system of claim 8, further comprising a system monitor to detect a failed secondary virtual machine from one of the secondary virtual machines, and to deploy a replacement virtual machine to store one of the memory blocks or error correction block previously stored in the failed secondary virtual machine upon detecting the failed secondary virtual machine.

13. The system of claim 8, wherein the primary hypervisor generates the error correction block by computing an exclusive-or operation on the memory blocks.

14. The system of claim 8, wherein the primary hypervisor divides the virtual machine state and generates the error correction block repeatedly over time.

15. A computer program product for checkpointing virtual machines, the computer program product comprising a non-transitory computer readable storage medium having program instructions embodied therewith, the program instructions executable by a processor to cause the processor to perform a method comprising: executing an application by a primary virtual machine on a primary computer; dividing a virtual machine state of the primary virtual machine into a plurality of memory blocks, the virtual machine state including a virtual memory state and a virtual central processing unit (CPU) state of the primary virtual machine; generating an error correction block based on the plurality of memory blocks such that if one of the memory blocks becomes an unusable memory block, the error correction block can restore the unusable memory block, the error correction block being utilized to restore the virtual machine state when one of the memory blocks becomes unusable; storing the memory blocks and error correction block across a plurality of secondary computers, each secondary computer stores a secondary virtual machine; and iterating the divide, generate and store operations over time.

16. The computer program product of claim 15, the program instructions further executable by a processor to:
suspend execution of instructions at the primary virtual machine prior to dividing the virtual machine state of the primary virtual machine into the plurality of memory blocks; and
resume execution of the instructions at the primary virtual machine after dividing the virtual machine state of the primary virtual machine into the plurality of memory blocks.

17. The computer program product of claim 15, the program instructions further executable by a processor to:
detect a failure at the primary virtual machine; and
deploy a replacement virtual machine after detecting the failure at the primary virtual machine, the replacement virtual machine including a replacement virtual machine state constructed from the memory blocks and error correction block stored across the secondary virtual machines.

18. The computer program product of claim 17, wherein the replacement virtual machine is one of the plurality of secondary virtual machines.

19. The computer program product of claim 15, the program instructions further executable by a processor to:
detect a failed secondary virtual machine from one of the plurality of secondary virtual machines; and
deploy a replacement virtual machine to store one of the memory blocks or error correction block previously stored in the failed secondary virtual machine upon detecting the failed secondary virtual machine.

20. The computer program product of claim 15, wherein the program instructions executable by a processor to generate the error correction block includes program instructions executable by a processor to perform an exclusive-or operation on the memory blocks.

\* \* \* \* \*